(12) United States Patent
Martin

(10) Patent No.: US 9,630,270 B2
(45) Date of Patent: Apr. 25, 2017

(54) CART AND APPARATUS FOR WELDING STUDS

(71) Applicant: Gerald Martin, St. Charles, MO (US)

(72) Inventor: Gerald Martin, St. Charles, MO (US)

(73) Assignees: New Rule Products, Inc, St. Charles, MO (US); Gerald D. Martin, St. Charles, MO (US)

( * ) Notice: Subject to any disclaimer, the term of this patent is extended or adjusted under 35 U.S.C. 154(b) by 420 days.

(21) Appl. No.: 14/258,242

(22) Filed: Apr. 22, 2014

(65) Prior Publication Data

US 2014/0312007 A1    Oct. 23, 2014

Related U.S. Application Data

(60) Provisional application No. 61/854,314, filed on Apr. 22, 2013.

(51) Int. Cl.
  *B23K 9/20*    (2006.01)
(52) U.S. Cl.
  CPC .............. *B23K 9/206* (2013.01); *B23K 9/202* (2013.01)

(58) Field of Classification Search
  CPC ......... B23K 9/201; B23K 9/202; B23K 9/206
  See application file for complete search history.

(56) References Cited

U.S. PATENT DOCUMENTS

| | | | | |
|---|---|---|---|---|
| 3,562,484 A * | 2/1971 | Murdock | ............... | B23K 9/201 108/90 |
| 3,900,131 A * | 8/1975 | Ehrlich | .................. | B23K 9/206 221/169 |
| 4,019,013 A * | 4/1977 | Spisak | .................. | B23K 9/206 219/98 |
| 5,130,510 A * | 7/1992 | Zeigler | .................... | B23K 9/20 219/98 |
| 8,507,824 B2 | 8/2013 | Martin | | |
| 2007/0199277 A1* | 8/2007 | Martin | ..................... | E04B 5/40 52/750 |

* cited by examiner

*Primary Examiner* — Ryan Reis

(57) ABSTRACT

A stud feed assembly for welding studs comprising a stud loader and a stud catcher. The stud loader comprises a first chute component and a second chute component, the first chute component having a greater diameter than the second chute component. The stud catcher comprises a receiving component and a vertical component, the receiving component being shaped to receive it stud such that the receiving component aligns the received stud in a substantially vertical position.

20 Claims, 7 Drawing Sheets

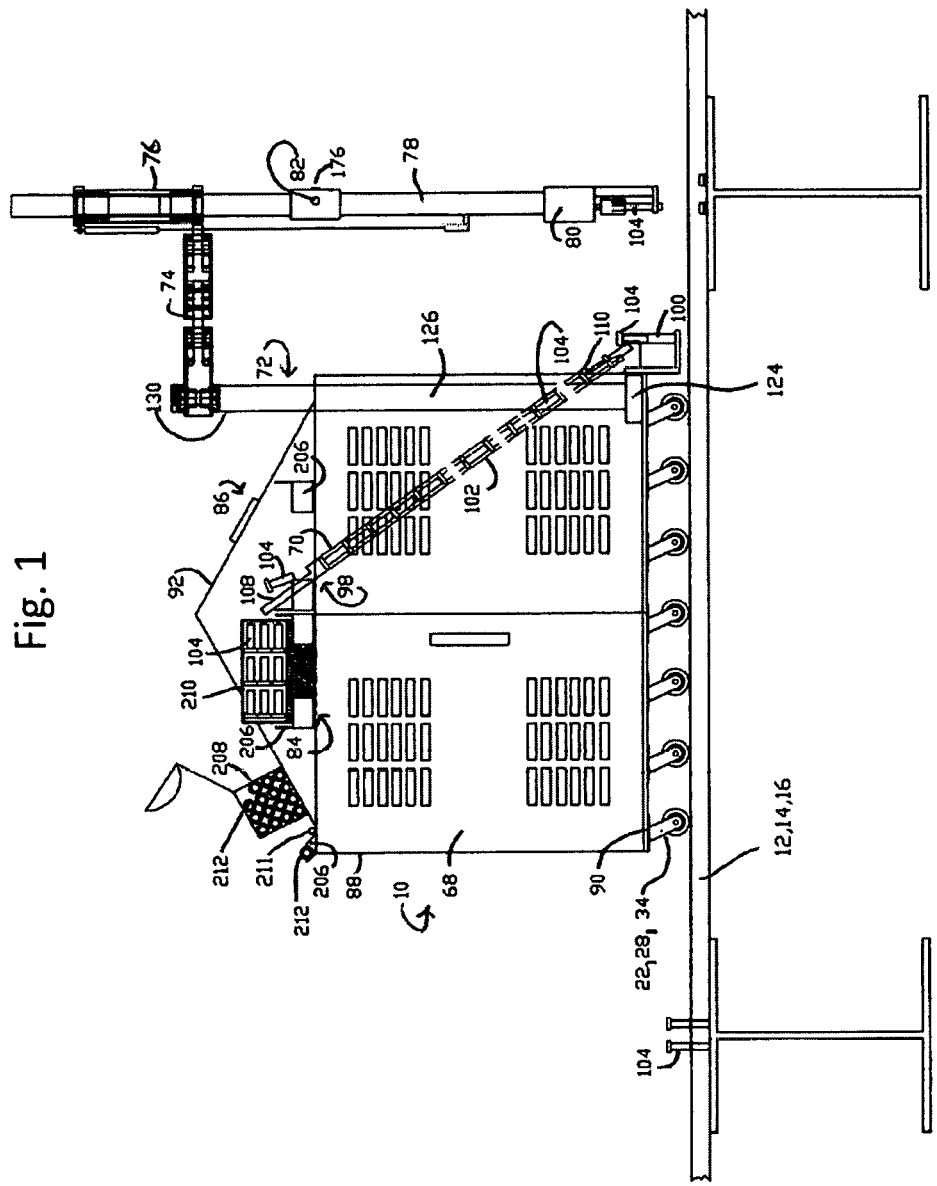

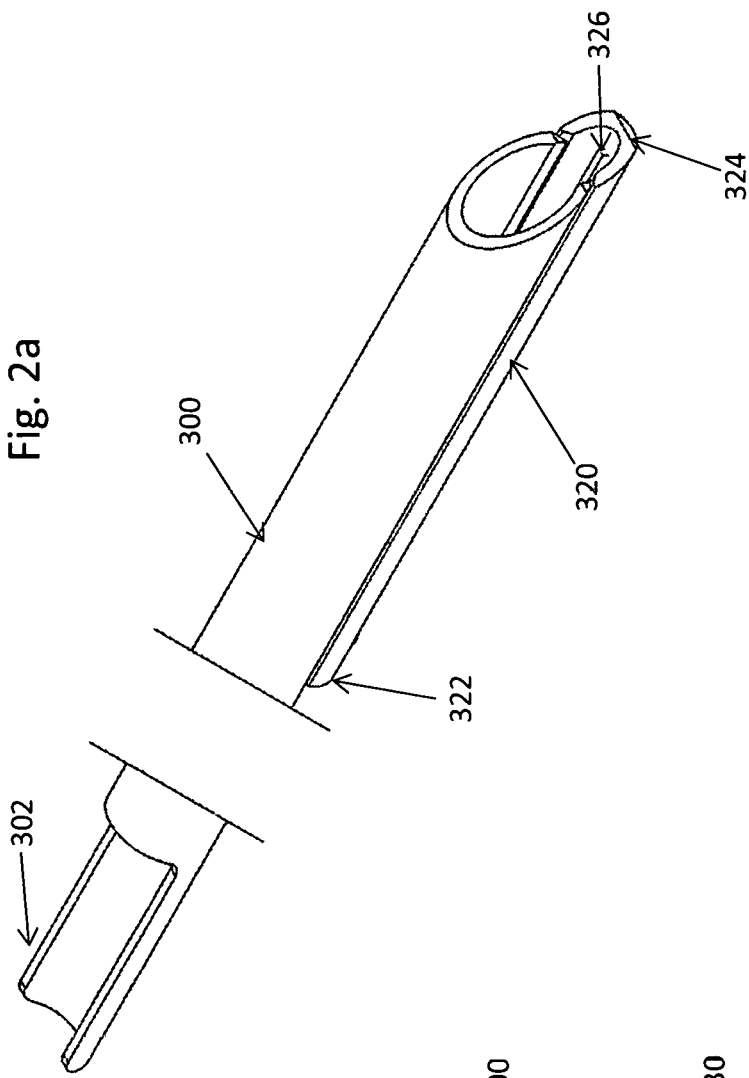
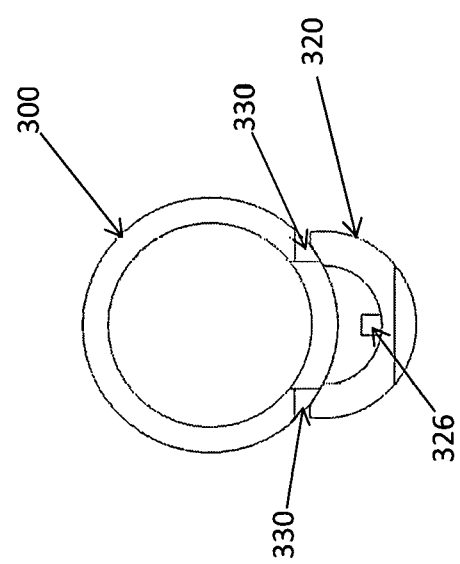

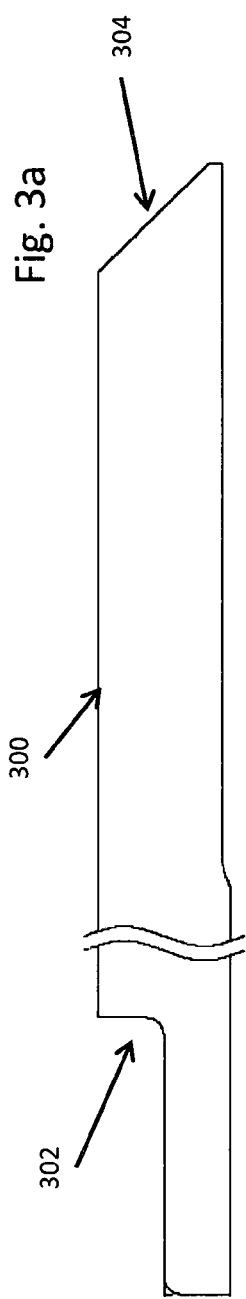
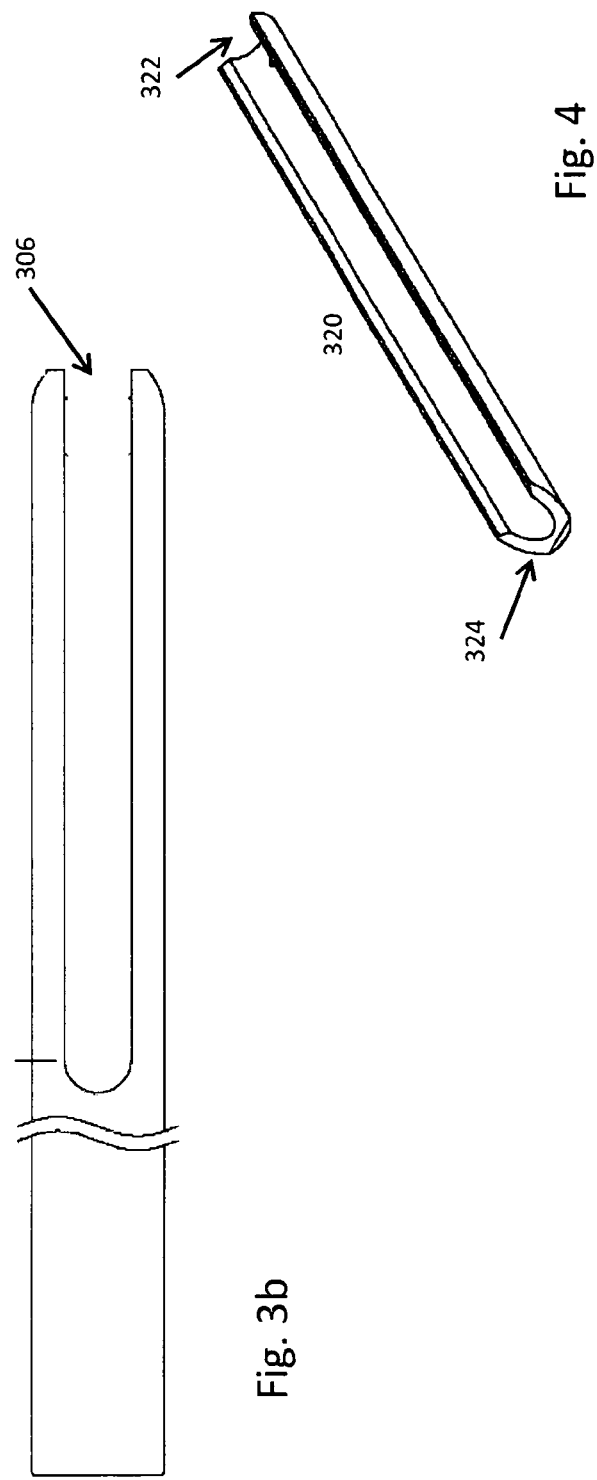

CART AND APPARATUS FOR WELDING STUDS

CROSS-REFERENCE TO RELATED APPLICATIONS

This application claims priority under 35 U.S.C. §119(e) of U.S. Provisional Patent Application No. 61/854,314 filed Apr. 22, 2013, in the name of the present inventor and entitled "SYSTEM FOR PROCESSING FLOOR DECKING OF STRUCTURES" and which is fully incorporated herein by reference.

STATEMENT REGARDING FEDERALLY SPONSORED RESEARCH

Not Applicable.

BACKGROUND

This disclosure relates to an apparatus for improved welding performance. The apparatus can be utilized in a weld cart which deposits deck material on a beam structure, processes the deck material and stud welds shear connectors (known as "studs") onto hare beams or through the deck material to the beam and scientifically analyzes weld parameters, such as time, current, lift and plunge, used during the stud weld process. Embodiments of a representative weld cart were disclosed in U.S. Pat. No. 8,507,824. Embodiments of the present disclosure relate to the cart disclosed in U.S. Pat. No. 8,507,824, which shares the same inventor as the present disclosure, and which claims priority to provisional patent application U.S. 60/763,184, filed on Jan. 27, 2006, both of which are fully incorporated herein by reference.

Generally, U.S. Pat. No. 8,507,824 discloses a cart for welding studs while traversing a construction floor decking that has sequential peaks and valleys. The cart comprises a housing, a stud feed assembly connected to the housing, an arm assembly movably connected to the housing, and a stud gun axially connected to the extension member. Features of the cart may be configured such the entry of a trough accepts a plurality of studs and guides them into a chute. The chute has an angled surface and delivers studs into the receptacle of a stud catcher. The stud catcher receives and aligns studs for placement and welding by the operator.

However, specific embodiments of the cart of U.S. Pat. No. 8,507,824 are limited to the type of jobs for which they were designed. Specifically, the design features of the chute and stud catcher must be sized for a specific size, or narrow range of sizes, of studs. If a job requires use of different size studs, operators may be required to change out the stud feed assembly, including trough, chute, and stud catcher, in order to work with the different sized studs.

A need therefore exists for a stud feed assembly that does not have to be changed out when a different size stud is utilized. It therefore is an objective of the present invention to satisfy this need, as well as to provide improved weld performance and efficiency over the previous art. As discussed in detail below, presently disclosed aspects of the invention solve this problem by offering improvements to the chute and the stud catcher assembly, identified as the "chute 102" and "stud catcher 100" in U.S. Pat. No. 8,507,824, respectively.

SUMMARY

The novel aspects of the present disclosure were conceived to further improve efficiency, quality, and ergonomics of weld carts. Aspects of the invention are further directed toward an apparatus and a weld cart that can be used on jobs with varying sizes of weld studs. Many construction applications make use of a larger dimensional stud than previous versions of the weld cart could accommodate. The present invention incorporates new structural features and novel design aspects that accommodate the larger studs used in these applications. In particular, the invention disclosed herein will allow studs of at least ⅞ inches diameter, and up to or greater than 12 inches in length. Embodiments of the invention can accommodate 1 inch to 1¼ inches or larger diameter studs by appropriately scaling the dimensions as disclosed herein. The inventive aspects open the health, safety, economic, and efficiency benefits discussed in previous disclosures to a much broader commercial audience.

The present disclosure is directed to a stud feed assembly. In embodiments, the stud feed assembly may be used in a cart for welding studs. In other embodiments, the stud feed assembly may be used independent of a cart, for example, it may be mounted to a horizontal surface such as a table or other stand. In embodiments, the stud feed assembly comprises a stud loader and a stud catcher, wherein the stud loader has a first chute component and a second chute component. The stud loader is configured to feed a plurality of studs to the stud catcher. The first chute component has a first entry end, a first exit end, and a first diameter. The second chute component has a second entry end, a second exit end, and a second diameter. In an embodiment, the second diameter is smaller than the first diameter.

In embodiments, the first entry end and the second entry end have an opening configured to accept and align a plurality of studs in an end-to-end relationship. The second exit end has an angled surface configured to guide at least one stud of a plurality of studs out of the chute and toward the stud catcher. In embodiments, the angled surface has a range from about thirty degrees to about forty-five degrees. In embodiments, the angled surface has a generally U-shaped cutout.

In an embodiment, the first chute component has an opening that allows the leading edge of a stud from the plurality of studs to drop into the second chute component. Preferably, the second chute component is in the shape of a half cylinder and is oriented such that the inside diameter of the cylinder faces the opening in the first chute component. In an embodiment, the opening in the first chute component is a generally U-shaped cutout. In an embodiment, the opening in the first chute component does not allow the head of the stud from the plurality of studs to drop into the second chute component. In an embodiment, the stud feed assembly further comprises a slide bar inserted into the second chute component, such that the slide bar rests in the inside surface of the second chute component. The slide bar may be a thin piece of wire or a tab, either metal or plastic. It may be fastened to the inside surface of the second chute component by any convenient means, including welding, glue or epoxy.

In embodiments, the stud loader can accommodate at least two different diameter studs. In embodiments, the stud loader can accommodate studs with diameters of ¾ inches and ⅞ inches, or 1 inch and 1¼ inches, or diameters from ¾ inches to 1¼ inches. In a non-limiting embodiment, the stud loader can accommodate studs from 3 inches to 12 inches in length. In other embodiments, the stud loader can accommodate shorter or longer length studs. In embodiments, the stud feed assembly can accommodate different size, length, and diameter studs without any changes or adjustments.

The stud catcher comprises a receiving component and a vertical component. In embodiments, the receiving component is positioned in proximity to the first exit end and the second exit end of the stud loader, and is shaped to receive a stud from the plurality of studs such that the receiving component receives and aligns the received stud. In an embodiment, the receiving component is in contact with the second exit end of the second chute component to allow for better alignment of received studs. In an embodiment, the vertical component comprises a circular shaped tube having an inner diameter and an outer diameter, the inner diameter being larger than the received stud. In embodiments, the vertical component may be made from stock having a non-circular cross section. However, the vertical component should have an internal diameter that is circular or substantially circular. In an embodiment, the vertical component further comprises an opening facing away from a cart. The opening typically runs substantially the entire length of the vertical tube. The opening in the vertical component is preferably wide enough to receive the diameters of different sized studs. Preferably, the diameter of the vertical component is able to receive studs of different diameters and lengths. In an embodiment, the diameter of the vertical component is able to receive studs that range in length from 3 inches to 12 inches.

The receiving component is attached to the top of the vertical component. Generally, the portion of the receiving component located above the opening in the vertical component is substantially solid, and the portion of the receiving component located across from the opening in the vertical component is substantially open. The interior geometry of the receiving component is configured to guide a received stud into a substantially vertical alignment. In embodiments, the interior geometry of the receiving component is angled or curved. The exterior geometry of the receiving component comprises an angle or a roll bar to guide the head of a received stud onto the top of the receiving component.

The present disclosure is further directed to a cart for welding studs. The cart may perform welds while traversing a construction floor decking. A common floor decking has sequential peaks and valleys, however, the cart also may be configured to traverse flat surfaces. The cart comprises a housing, a stud feed assembly, an arm assembly, and a stud gun. The housing has a base, a top and a side connecting the base and the top. The stud feed assembly is connected to the housing, and the first entry end and second entry end are positioned near the top of the housing, and the second exit end are positioned near the base of the housing and extending outward from the side of the housing. In embodiments, the first entry end and the second entry end extend beyond the top of the housing and the second exit end extends beyond the side of the housing opposite the stud catcher.

The stud catcher is connected near the base of the housing. The receiving component is shaped to receive a stud from the plurality of studs such that the receiving component vertically aligns the received stud with respect to the housing. In embodiments, the vertical component of the stud catcher is oriented in a substantially vertical position with respect to the housing. The receiving component is connected to the top end of the vertical component, and is positioned in proximity to the angled surface of the second exit end of the chute. In embodiments, the vertical component comprises a circular shaped tube having an inner diameter and an outer diameter, the inner diameter being larger than the received stud. In an embodiment, the vertical component further comprises an opening facing away from the cart.

The arm assembly is movably connected to the housing, and has a linkage member extending beyond the side of the housing and an extension member vertically connected to the linkage member. The linkage member is configured to be a rotate-able extension member about the housing.

In embodiments, the stud gun is axially connected to the extension member wherein a worker, while in a standing position, moves the extension member to position the stud gun to capture the stud that is vertically aligned within the receiving component of the stud catcher and the worker then moves the captured stud and stud gun to a welding location where the worker activates the stud gun to stud weld the stud while the worker remains in the standing position. In embodiments, the stud gun includes a displacement transducer configured to measure, in real time, a lift displacement and a plunge displacement experienced by the stud gun as the stud gun stud welds the stud.

In embodiments, the cart further comprises a wheel assembly connected to the cart. The wheel assembly has an array of wheels forming rows and columns of wheels positioned under the cart, wherein at any given instant of time a number of the wheels of the rows and columns contact a plurality of peaks of the construction floor decking and while other wheels extend over and free from contacting the valleys such that the cart can uniformly traverse the construction floor decking. In embodiments, adjacent rows of wheels are laterally offset from each other and wherein adjacent columns of wheels are longitudinally offset from each other.

In embodiments, the cart further comprises an analyzer operatively connected to the stud gun, wherein the analyzer comprises a time circuit which measures, in real time, time of the activated stud gun; a current circuit that measures, in real time, current applied to the stud gun as the stud gun stud welds the stud; a lift circuit which measures, in real time, the lift displacement and a plunge circuit which measures, in real time, the plunge displacement such that the real time measurements of the time circuit, the current circuit, the lift circuit and plunge circuit are measured at the location of the welded stud.

BRIEF DESCRIPTION OF THE DRAWINGS

In the accompanying drawings which form part of the specification:

FIG. 1 is a front elevational view of an embodiment of a cart and wheel assembly constructed in accordance with the present disclosure;

FIG. 2a displays an embodiment of the double chute for use in the stud feed assembly;

FIG. 2b is a cross sectional view of an embodiment of the double chute for use in the stud feed assembly;

FIG. 3a displays a side view of an embodiment of the first chute component;

FIG. 3b displays an under-side view of an embodiment of the first chute component;

FIG. 4 displays an embodiment of the second chute component;

DETAILED DESCRIPTION

Figure 5C:
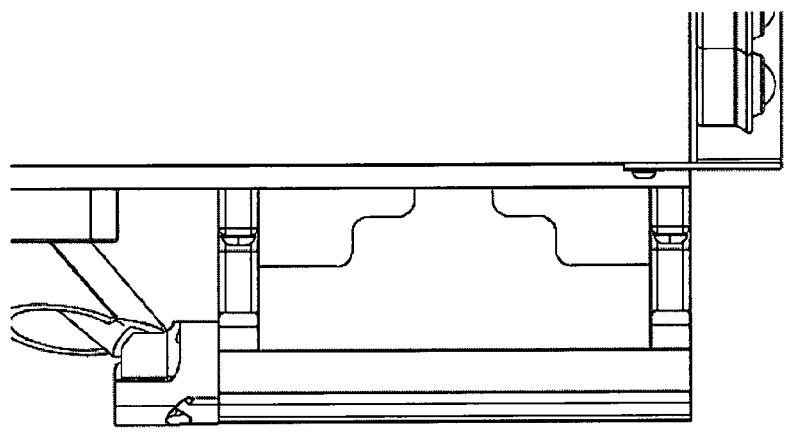
FIGS. 5a-5c displays an embodiment of a stud feed assembly and a stud catcher assembly constructed in accordance with the present disclosure.

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. Presently disclosed aspects of the invention derive from and are improvements to embodiments disclosed in U.S. Pat. No. 8,507,824. Significant improvements to the invention relate to the stud trough assembly and the stud catcher assembly, identified as the "chute 102" and "stud catcher 100" in U.S. Pat. No. 8,507,824, respectively. Embodiments in the present disclosure may be utilized in a weld cart, or they may be utilized as a standalone apparatus for welding studs.

U.S. Pat. No. 8,507,824 discloses a cart for welding studs while traversing a construction floor decking that has sequential peaks and valleys. The cart comprises a housing, a stud feed assembly connected to the housing, an arm assembly movably connected to the housing, and a stud gun axially connected to the extension member. The housing has a base, a top and a side connecting the base and the top. The stud feed assembly is connected to the housing, and comprises a stud loader and a stud catcher, the stud loader having a chute connected to the housing to feed a plurality of studs to the stud catcher, the chute includes an entry end and an exit end, the entry end being positioned near the top of the housing and the exit end being positioned near the base of the housing and extending outward from the side of the housing, the entry end having an opening configured to accept and align the plurality of studs in an end-to-end relationship, the exit end having an angled surface configured to guide at least one stud of the plurality of studs out of the chute and toward the catcher, the stud catcher being suspendably connected to near the base of the housing, the stud catcher having a receiving component positioned in proximity to the exit end, the receiving component being shaped to receive the stud from the plurality of studs such that the receiving component vertically aligns the received stud with respect to the housing. The arm assembly has a linkage member extending beyond the side of the housing and an extension member vertically connected to the linkage member, the linkage member being configured to rotate-able extension member about the housing.

The stud gun allows a worker, while in a standing position, to move the extension member to position the stud gun to capture the stud that is vertically aligned within the receiving component of the stud catcher and the worker then moves the captured stud and stud gun to a welding location where the worker activates the stud gun to stud weld the stud while the worker remains in the standing position. The stud gun may include a displacement transducer configured to measure, in real time, a lift displacement and a plunge displacement experienced by the stud gun as the stud gun stud welds the stud. The cart may include an analyzer operatively connected to the stud gun wherein the analyzer comprises a time circuit which measures, in real time, time of the activated stud gun; a current circuit that measures, in real time, current applied to the stud gun as the stud gun stud welds the stud; a lift circuit which measures, in real time, the lift displacement and a plunge circuit which measures, in real time, the plunge displacement such that the real time measurements of the time circuit, the current circuit, the lift circuit and plunge circuit are measured at the location of the welded stud.

The features of the cart may be configured such that the entry end extends beyond the top of the housing and the exit end extends beyond the side of the housing opposite the stud catcher, the entry end having a trough to accept and to guide the plurality of studs into the chute, the exit end having an angled surface to guide the stud into the receiving component of the stud catcher. The angled surface may have a range from about thirty degrees to about forty-five degrees. The angled surface may have a generally U-shaped cutout.

In embodiments, the cart comprises a wheel assembly connected to the cart, the wheel assembly having an array of wheels forming rows and columns of wheels positioned under the cart wherein at any given instant of time a number of the wheels of the rows and columns contact a plurality of peaks of the construction floor decking and while other wheels extend over and free from contacting the valleys such that the cart can uniformly traverse the construction floor decking. In embodiments, the wheel assembly comprises adjacent rows of wheels laterally offset from each other and adjacent columns of wheels longitudinally offset from each other.

Aspects and embodiments of the invention are explained in more detail in the drawings. Those skilled in the art will readily be able to comprehend the inventive improvements by applying the disclosure above to the figures. Similarly, one skilled in the art will readily appreciate that the drawings represent but one embodiment of the new invention. Accordingly, the drawings are merely meant to be representative, rather than limiting, of the scope of the invention.

Referring to the drawings, the present disclosure relates to a cart 10, as shown in FIG. 1, that uniformly traverses a floor decking used in construction of a structure such as a building or a bridge. The floor decking may comprise a variety of configurations. Each configuration of the floor decking may comprise standard gauge metal decking such 16 gauge, 18 gauge and 20 gauge steel as rated by the American Institute of Steel Construction. In one embodiment, the floor decking comprises a metal deck used as a form for concrete pouring.

A wheel assembly generally shown as 22 connects to the cart 10. The wheel assembly 22 is sized and shaped to uniformly traverse floor deckings. The wheel assembly 22 comprises a base connected to a bottom of the cart. The wheel assembly 22 has an array of wheels that a predetermined pattern of wheels positioned under the cart 10.

The cart 10 comprises: a housing 68, a stud feed assembly generally shown as 70; a stud gun tower 72, a moveable arm assembly generally shown as 74; a stud gun stabilizer generally shown as 76; a stud gun extension generally shown as 78; a stud gun 80; an adjustable handle assembly 82; a component holding assembly generally shown as 84 and a control assembly generally shown as 86.

The stud feed assembly 70 comprises a stud loader 98 and a stud catcher 100. The stud loader 98 has a chute 102 positioned within the interior of the housing 68 to feed a plurality of studs 104 to the stud catcher 100. In an embodiment, the chute 102 angularly positions within the housing 68. As shown, the stud catcher 100 externally connects to one of the sides 88 of the housing 68. The stud catcher 100 has a receiving component in communication with the chute 102, wherein the receiving component is shaped to receive a stud from the plurality of studs 104 such that the receiving component vertically aligns the received stud 104 with respect to the housing. The stud 104 then can be removed with the stud gun 80, allowing a new stud 104 to enter the stud catcher.

In an embodiment, the chute 102 comprises an entry end 108 and an exit end 110. The entry end 108 extends beyond the top of the housing 68 and the exit end 110 extends beyond the side 88 near the stud catcher 100. The entry end 108 includes a trough to accept and guide the plurality of studs 104 into the chute 102. The exit end 110 includes an angled surface to guide the stud 104 into the stud catcher 100.

Regarding the stud feed assembly, previous embodiments of the invention were discussed in U.S. Pat. No. 8,507,824 in FIGS. 15a, 15b, 16a, 16b and corresponding disclosure. According to previously disclosed aspects, the stud feed assembly comprised a chute 102 with an angled surface that assisted in guiding the stud into the stud catcher 100. In earlier embodiments, the stud feed assembly comprised a stud trough consisting of one piece, and was located a measured distance from the stud catcher. The measured distance was unique to each embodiment, and had to be changed when different length studs were used. The stud trough also had to be changed to accommodate different stud lengths.

According to an embodiment of the newly disclosed invention, as depicted in FIG. 2a the new stud feed assembly comprises a first chute component 300 and a second chute component 320. The first chute component 300 has a first entry 302 end, a first exit end 304, and a first diameter. The second chute component has a second entry end 322, a second exit end 324, and a second diameter. The first entry end 302 and the second entry end 322 each have an opening configured to accept and align a plurality of studs in an end-to-end relationship. The second exit end 324 has an angled surface configured to guide at least one stud of a plurality of studs out of the chute and toward the stud catcher. The stud feed assembly is configured to feed a plurality of studs to the stud catcher.

In an embodiment, the second chute component of the new stud feed assembly consists of a half pipe fastened to the bottom of the first chute component. This embodiment is representatively depicted in FIG. 4. Preferably, the first chute component and the second chute component are welded together to form an extended chute. Representative weld locations are depicted at 330 in FIG. 2b. This allows the half pipe design to continue the bottom edge of the chute for a closer delivery of the stud to the stud catcher. In embodiments of the invention, the first exit end 304 and/or the second exit end 324 of the chute may be physically connected to the stud catcher assembly 400. In preferred embodiments, the centerlines of the first chute component 300 and the second chute component 320 are substantially parallel.

In embodiments, the stud feed assembly further comprises an optional slide bar 326 inserted into the second chute component 320, such that the slide bar rests in the inside surface of the second chute component 320. The optional slide bar 326 assists with guiding studs of different sizes into the stud catcher assembly. The slide bar 326 may be any type of material that assists with guiding studs into the stud catcher assembly. In embodiments, the slide bar 326 may be a thin piece of wire or a tab, either metal or plastic. The slide bar 326 may be attached by any convenient means, such as welding.

In embodiments, the first chute component 300 of the new stud feed assembly may be an embodiment of a chute as disclosed in FIGS. 15a, 15b, 16a and 16b of U.S. Pat. No. 8,507,824; and in FIGS. 3a and 3b of the present disclosure. In an important feature of the newly disclosed invention, embodiments allow for the first chute component to accommodate a range of stud sizes. In a non-limiting example a first chute component of the present stud feed assembly will accommodate ¾ inch and ⅞ inch diameter studs, ranging from 3 inches to 12 inches in length. In earlier embodiments, the chute had to be sized to a specific diameter and length of stud for each job.

The range of the first chute component 300 is accomplished by sizing it at a diameter to accommodate larger studs. Next, the first chute component 300 is provided with an opening 306 in the bottom of the delivery end. The opening 306 allows the leading edge of a stud to drop into the second chute component 320, to align and orient the stud for delivery to the stud catcher assembly 400. The opening 306 allows for a range of different size studs to pass through. In embodiments, the opening 306 is sized such that the head of the stud does not drop into the second chute component 320. The angle at which the opening 306 is cut allows the desired travel for both large studs and small studs.

In an embodiment, depicted in FIG. 2b, the second chute component 320 has a smaller diameter than the first chute component 300. When joined together, the larger diameter of the first chute component 300 accommodates larger studs. Smaller studs, which previously would not have been aligned and delivered properly in a large diameter pipe, are accommodated by the smaller diameter of the second chute component 320 and delivered to the stud catcher 400 in proper alignment. By creating a chute with dual diameters, the invention therefore accommodates larger and smaller diameter studs using the same assembly. As should be understood by those skilled in the art, this inventive step removes the need to continuously add and remove components of the cart for different job applications.

The novel chute design also changes the angle at which the studs follow each other in the delivery line. An important feature of this design is the ability to locate the leading edge of a trailing stud on a lower plane than the head of the stud in front of it. In effect, when the lead end of a stud enters the second chute component, the diametric center of the front end of the stud travels in a different parallel plane than the diametric center of the head of the same stud. The two plane feature allows the front of a trailing stud, situated on a lower plane, to position against or even under the head of the stud in front of it, which is situated on a higher plane. When placed in series in the chute, the trailing stud mechanically pushes the leading stud into position for delivery into the vertical component. The two plane feature also gives the stud a "head start" in moving into vertical alignment.

In embodiments, the double chute design can accommodate a range of different stud sizes. Studs are commonly ¾ inch diameter, and vary by length. Shorter length studs have a length measurement ranging from about three inches to about four inches. In embodiments, the shorter length studs may have length measurements of: 3 and 3/16 inches or 3 and ⅜ inches. The medium and longer length studs have height measurement ranges from about four inches to about seven inches. In embodiments, the medium length, studs may have length measurements of: 3 and ⅞ inches, 4 and 3/16 inches or 4 and ⅜ inches. In other embodiments, the medium length stud has length measurements of 4 and ⅞ inches, 5 and 3/16 inches and 5 and ⅜ inches. In an embodiment, the long length stud has length measurements of: 5 and ⅞ inches, 6 and 3/16 inch, and 6 and 3/8 inch. Long length studs can be up to 12 inches or longer. In other embodiments, the studs can have diameters of 7/8 inches, 1 inch, or greater. Embodiments of the novel double chute design can accommodate all of these sizes, or more, or subsets of these sizes, within a single stud loader. Previous designs required a specific diameter trough for a specific diameter stud, and a particular exit end could only accommodate a narrow range of stud lengths within that diameter. A collar was further required to fine tune the assembly to accommodate each individual stud length and diameter. The new design therefore eliminates the need to change out the said loader every time a different diameter and length stud is used.

The angled surface assists discharging the stud into the stud catcher in the vertical position. In other words, the discharging stud slides along the angled surface wherein the angled surface creates the proper arc for the stud to leave a diagonal plane from the chute and end up in a vertical position in the stud catcher. The angled surface preferably has an angle range from about thirty degrees to about forty-five degrees, although angles outside of this range may be necessary depending on the selected measurements of the cart.

Regarding the stud catcher assembly, previous iterations of the invention were disclosed in U.S. Pat. No. 8,507,824 in FIGS. 17a, 17b, and 17c and the corresponding discussion. According to the earlier disclosed aspects, the stud catcher was designed with a vertical tube that included a cutout to receive studs from the chute. In previous preferred embodiments, studs in the vertical tube were visible from the rear (the cart-side of the assembly) that assisted in guiding the stud into the stud catcher. In other words, the cutout in the vertical tube faced toward the cart, and not away from the cart.

Importantly, the previous design requires relatively precise dimensions to operate properly. Because of the dimensional features, the lead end of a stud essentially would tend to travel through the air when leaving the chute and before arriving at the catcher. A finger, or guide tab, was utilized to help guide the stud into the catcher by providing a roll point for shorter length studs. Even with this assisting feature, the stud catcher was required to be placed in close enough proximity to the chute to prevent the stud from missing its target and spilling out of the assembly. Because of the close proximity requirements, if the stud catcher was placed too close to the chute, longer studs could become lodged in place, without sufficient space to complete the turn from the chute into the stud catcher.

It should be understood, therefore, that previous designs were highly use-specific, and any variance in the dimensions of studs utilized for different jobs could require a substantially different cart configuration, including dimensions and locations of the chute and stud catcher assembly. Such changes could include re-dimensioning the chute and the stud catcher, as well as repositioning the stud catcher with respect to the exit end of the chute. It should be understood that these problems are corrected with the newly disclosed stud catcher assembly. Embodiments of the invention can accommodate a plurality of studs, where the plurality of studs comprises studs of different lengths and diameters, where no further changes to the stud feed assembly are required to accommodate the studs of different lengths and diameters.

Figure 5B:
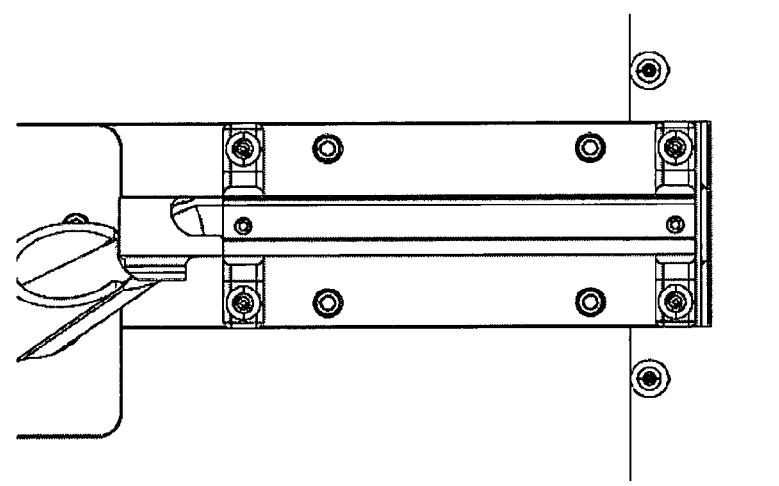
Figure 5A:
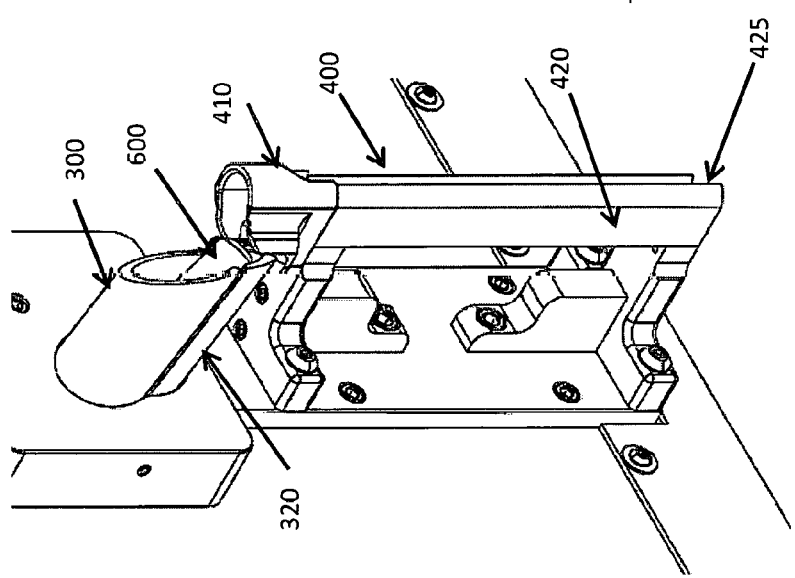
Figure 6C:
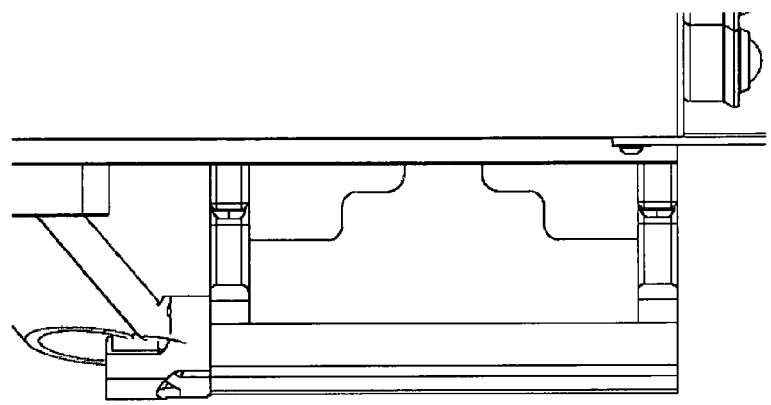
FIGS. 6a-6c display an embodiment of a stud feed assembly and a stud catcher assembly constructed in accordance with the present disclosure.
Figure 6B:
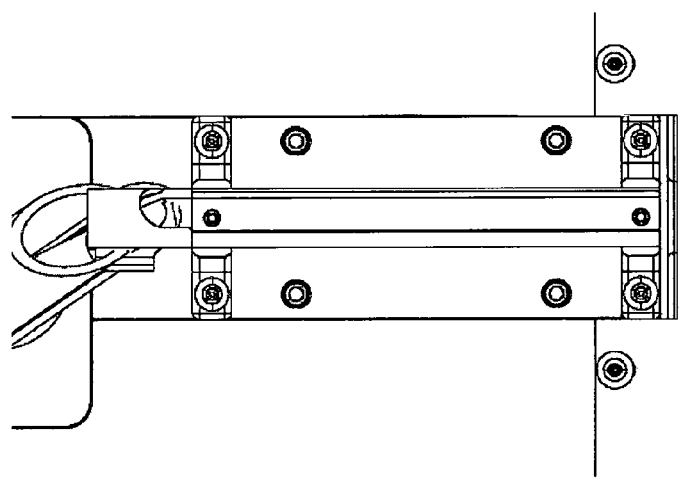
Figure 6A:
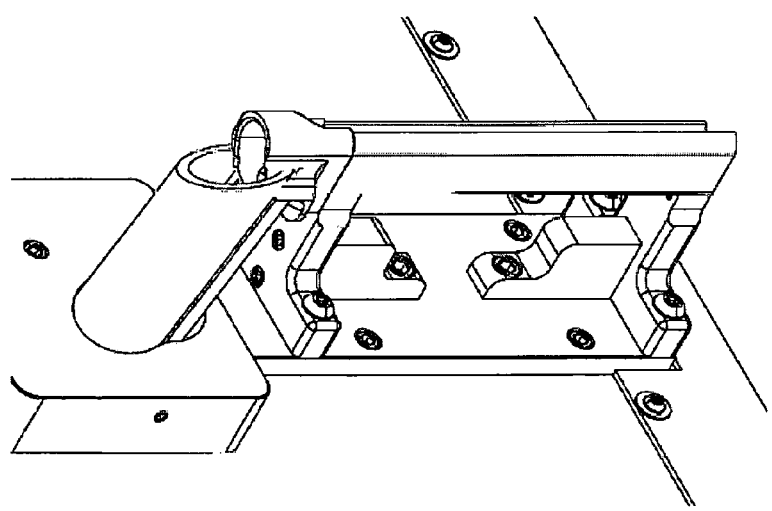

According to the presently disclosed aspect of the invention, the stud catcher assembly is comprised of two pieces. As disclosed and depicted in FIGS. 5a, 5b and 5c, the stud catcher assembly 400 comprises a receiving component 410 and a vertical component 420. The receiving component 410 sits above the vertical component 420. The receiving component and the vertical component are fastened together to form a vertical column with a receiving component at the top end. The vertical component 420 is preferably in the shape of a tube. Preferred internal diameters of the vertical component 420 will accommodate the diameter of all sizes of studs that may be used for a given job. In an embodiment, the receiving component 410 and the vertical component 420 may be integrated as one piece. In an embodiment, representatively depicted in FIGS. 6a, 6b and 6c, the stud catcher assembly 400 may be physically connected to the first exit end and/or second exit end of the stud feed assembly.

As with previously disclosed embodiments, the vertical component 420 can be a tube that aligns studs in a substantially vertical position after the studs are received from the stud loader of the stud feed assembly. In representative embodiments of the invention, the vertical component 420 may have a vertical opening 425 facing to the front (i.e., facing away from the cart, in embodiments comprising a cart). In preferred embodiments of the new invention, the vertical component 420 is located in closer proximity to the exit end of the chute of the stud feed assembly 304 and 324. The opening 425 typically runs substantially the entire length of the vertical tube. The opening 425 in the vertical component 420 is preferably wide enough to receive the diameters of different sized studs. Preferably, the diameter of the vertical component 420 is able to receive studs of different diameters and lengths. In an embodiment, the diameter of the vertical component 420 is able to receive studs that range in length from 3 inches to 12 inches.

The receiving component 410 is attached to the top of the vertical component 420. Generally, the portion of the receiving component 410 located above the opening 425 in the vertical component 420 is substantially solid, and the portion of the receiving component 410 located across from the opening 425 in the vertical component 410 is substantially open.

Figure 8C:
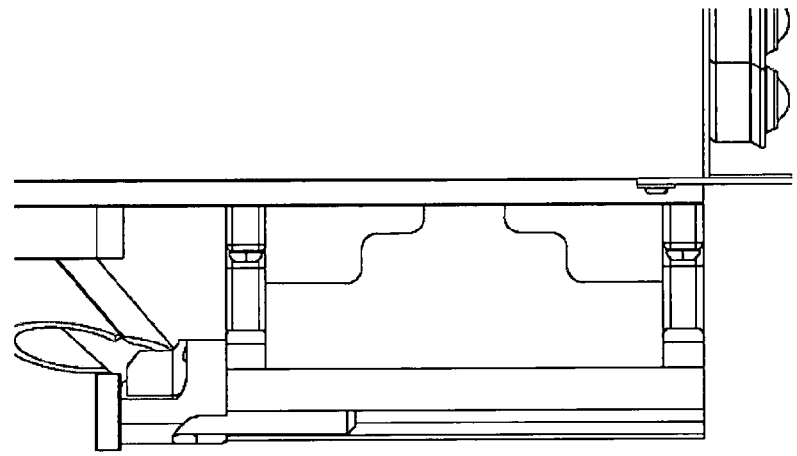
FIGS. 8a-8c display the orientation of a stud with respect to a stud catcher assembly constructed in accordance with the present disclosure.
Figure 8B:
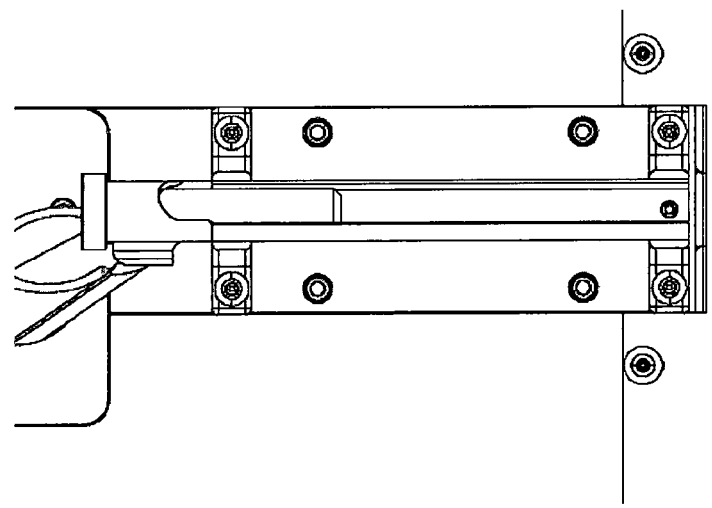
Figure 8A:
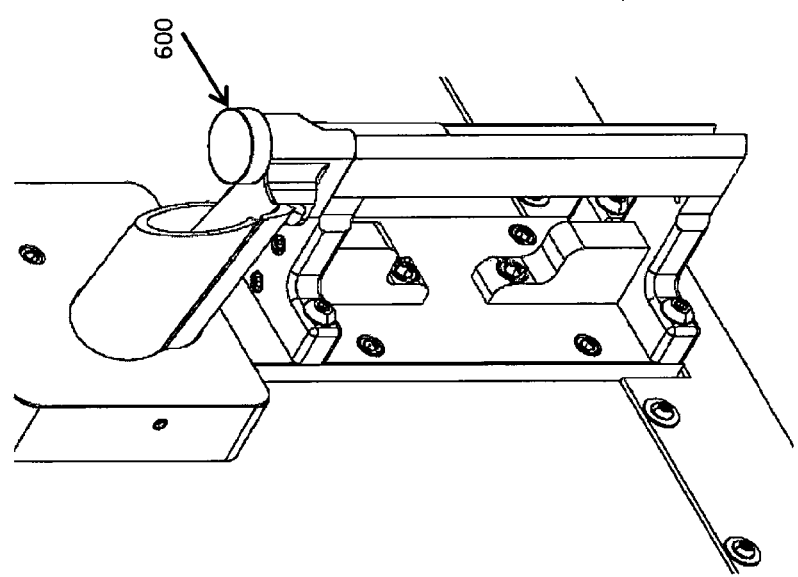

This inventive aspect delivers the studs more closely to the stud catcher assembly. Although the previous invention exhibited excellent delivery characteristics, the new chute assembly further improves on both delivery and the ability for larger diameter chutes to properly deliver smaller diameter studs. A preferred operation of the new design calls for the head of a stud to "roll" to, and rest on, the top of the receiving component 410. The stud then comes to rest with its body suspended into the vertical component 420 of the stud catcher assembly 400. A stud in its rest position is shown in FIGS. 8a-8c. The stud's travel is guided by the exterior geometry of the receiving component 410. Without the difference in planes, however, the front of a trailing stud merely pushes a leading stud into the receiving component, and the stud will not "roll" over to the top of the receiving component 410. This leads to studs not being oriented in a substantially vertical position, and can translate to the chuck on the end of the stud gun not being able to receive the stud head. The dual plane/double chute design eliminates this problem and further improves stud alignment for delivery to the stud gun.

In operation, the angled surface helps guide a plurality of studs from the second exit end of the chute to the stud catcher assembly 400. The studs may be the same diameter and length, or they may have different diameters and/or lengths, and they may be fed in a random order. The leading edge of the lead stud exits the second exit end 324, which acts as a tipping point for the stud. The stud rolls off the second exit end 324, and is guided to the receiving component 410. When the leading edge of the stud enters the receiving component 410, it contacts the interior geometry of the receiving component 410. The interior geometry of the receiving component 410 is configured to force the leading edge of the stud downward and assist with guiding the body of the stud into a substantially vertical position. The interior geometry of the receiving component 410 may be angled or curved, to assist with guiding the body of the stud into a substantially vertical position. The exterior geometry of the receiving component 410 is configured to allow the head of the stud to roll to the top of the receiving component 410. The travel of the stud is stopped when the stud has reached a substantially vertical alignment, and the bottom side of the head of the stud contacts and rolls on top of the solid outer portion of the receiving component 410 and comes to rest. A fully aligned stud comes to rest in a substantially vertical orientation, with its head resting on top of the receiving component 410 and its body suspended into the vertical component 420. When the stud has reached alignment in a substantially vertical position, the solid face of the vertical component 420 pins the aligned stud and further restricts its movement.

A trailing stud waits in the stud loader, with its leading end resting against the stud that is vertically positioned in the stud catcher assembly 400. In embodiments, the weight of one or more trailing studs assists with pushing a lead stud through its travel onto the receiving component 410 and into its substantially vertical alignment. The weight of the one or more trailing studs further helps restrict the vertically aligned stud's movement. When the stud 600 resting on top of the receiving component 410 is removed from the stud catcher assembly 400 by the stud gun, the trailing stud is then allowed to feed from the stud loader, via the second exit end of the second chute component, into the stud catcher 400 because the lead stud 600 has been removed from the stud catcher 400. This process repeats as long as there are studs waiting to be fed from the stud loader into the stud catcher.

Figure 7C:
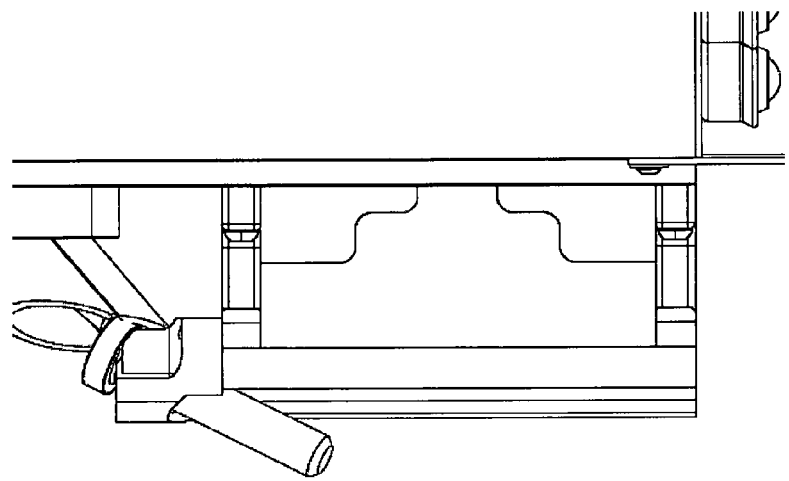
FIGS. 7a-7c display the operation of a stud with respect to an embodiment of a stud feed assembly and a stud catcher assembly constructed in accordance with the present disclosure.
Figure 7B:
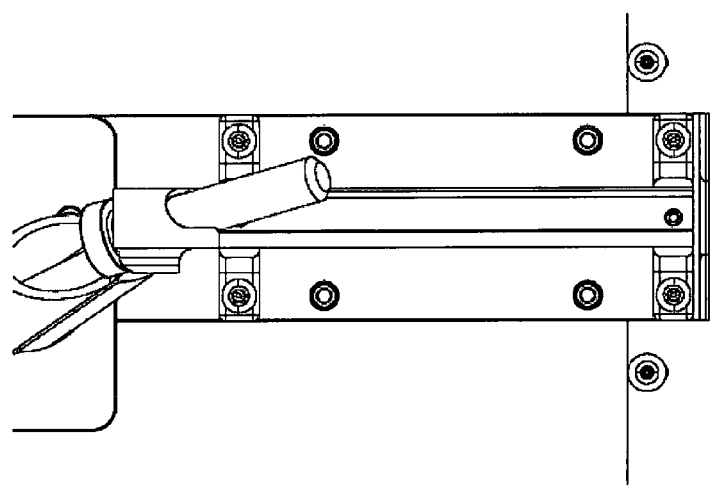
Figure 7A:
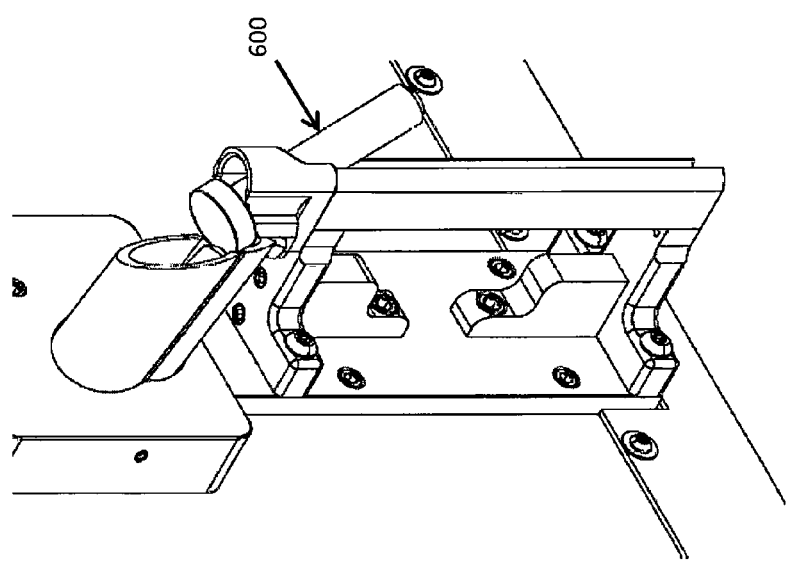

Operation of a preferred embodiment is shown in FIGS. 7a, 7b and 7c. A stud 600 passes from the first exit end 304 and second exit end 324 of the chute of the stud feed assembly into the stud catcher assembly 400. The opening 425 in the front of the vertical component 420 allows the body of the stud 600 to enter and pass through. This travel continues until the underneath side of the head of the stud 600 contacts the receiving component 410. The exterior geometry of the receiving component 410 then causes the stud 600 to roll over its top and aligns the stud 600 in a substantially vertical alignment, and substantially parallel to the vertical component 420.

It should further be recognized that this design structure allows for greater range of studs as compared with the previous design. For example, the width of the opening 425 can be varied to accommodate different diameter stud bodies. Additionally, because of the pass through travel allowed by the opening 425, as shown in FIGS. 7a-7c, the jamming concerns with the previous design are alleviated. It therefore is not necessary to vary the distance between the stud catcher and the exit end of the chute when using longer studs; a single dimensional design will allow for a range of stud lengths.

As should be readily understood by those skilled in the art, the inventive aspects disclosed herein offer significant improvements over the prior art. Specifically, at least the following improvements are taught:

1) The newly configured stud welding cart can weld studs with diameters of ¾ inches and ⅞ inches without changing the stud loader and stud catcher. The ability to accommodate the ⅞ inches diameter stud opens use of the cart to a wider range of contractors and types of jobs. By scaling tube lengths and diameters appropriately, the invention would readily accommodate studs of over 1 inch diameter with heads of 1½ inches or more. The larger studs may be accommodated in the same chute and catcher embodiment. Alternatively, embodiments may accommodate ¾ inch and ⅞ diameter studs; 1 inch and 1¼ inch studs; or ½ inch studs. The practical limit to the stud size the invention can accommodate is driven only by the industrial application. So long as the tube size are scaled to maintain the proper two plane chute and vertical alignment system, any size stud delivery is feasible.

2) Previously embodiments of the stud welding cart were preferably configured to weld stud lengths from 3 inches to 6 inches. Use of larger studs required a change in dimension and positioning of the chute and stud catcher. Newly disclosed embodiments of the cart can accommodate stud lengths ranging from 3 inches up to 12 inches or more, all within the same configuration. This eliminates the need to change or relocate the chute or stud catcher on the cart. As with the expanded range of stud diameters, the ability to weld this wide range of stud lengths adds versatility to the stud cart, allowing contractors to utilize it in situations and on jobs not previously applicable.

3) The novel universal double chute design may be permanently fixed as part of the cart design. This improves on the previous design, which utilized individual chutes for every stud size, length, and diameter. Instead of removing and reinserting a different chute for each different stud diameter and length, the carts may contain chutes produced in accordance with the present invention that will accept all of the commonly known diameters and lengths.

4) Previous embodiments of the catcher required a specific distance from the catcher to the exit end of the chute. The vertical position of the chute and the cut out on the end of the chute also were specific to the stud length. With the improvements as disclosed herein, the stud catcher can remain fixed to the cart. It does not have to be changed out when different length or diameter studs are utilized.

In view of the present disclosure, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense. As should be understood by those in the art, the stud feed assembly may be used as an independent apparatus, or it may be used as a feature of a weld cart. The changes disclosed herein may require dimensional modifications to previously disclosed weld carts. Specifically, the ability to accommodate longer and wider diameter studs may require dimensional modifications to the previously tool balancer assembly and gun extension assembly as disclosed in U.S. Pat. No. 8,507,824. Necessary dimensional modifications should be readily apparent to one skilled in the art, and the invention as disclosed herein should be read to encompass all such necessary or optional modifications.

I claim:

1. A stud feed assembly comprising:
a stud loader and a stud catcher,
wherein the stud loader has a first chute component and a second chute component; the first chute component having a first entry end, a first exit end, and a first diameter; the second chute component having a second entry end, a second exit end, and a second diameter, wherein the second chute component is semi-circular along a longitudinal span defined by the second entry end to the second exit end, wherein the second chute component is attached to an exterior surface of the first chute component; the first entry end and the second entry end having an opening configured to accept and align a plurality of studs in an end-to-end relationship; the second exit end having an angled surface configured to guide at least one stud of a plurality of studs out of the chute and toward the stud catcher; the stud loader being configured to feed the plurality of studs to the stud catcher; and wherein the stud catcher comprises a receiving component and a vertical component, the receiving component being positioned in proximity to the second exit end of the stud loader and being shaped to receive a stud from the plurality of studs such that the receiving component receives and aligns the received stud.

2. The stud feed assembly of claim 1, wherein the second diameter is smaller than the first diameter.

3. The stud feed assembly of claim 2, wherein the first chute component has an opening that allows a leading edge of a stud from the plurality of studs to drop into the second chute component.

4. The stud feed assembly of claim 3, wherein the opening in the first chute component is a generally U-shaped cutout.

5. The stud feed assembly of claim 3, wherein the opening in the first chute component does not allow a head of the stud from the plurality of studs to drop into the second chute component.

6. The stud feed assembly of claim 3, wherein the second chute component is generally in the shape of a half cylinder and is oriented such that the inside diameter of the cylinder faces the opening in the first chute component.

7. The stud feed assembly of claim 1, further comprising a slide bar inserted into the second chute component, such that the slide bar rests in the inside surface of the second chute component and wherein the slide bar helps to consistently align studs with the receiving component.

8. The stud feed assembly of claim 1, wherein the vertical component comprises an opening facing away from a cart, the opening running substantially the length of the vertical component.

9. The stud feed assembly of claim 1, wherein the vertical component comprises a circular shaped tube having an inner diameter and an outer diameter, the inner diameter being larger than the received stud.

10. The stud feed assembly of claim 8, wherein the opening in the vertical component is wide enough to receive the diameters of different sized studs.

11. The stud feed assembly of claim 8, wherein the diameter of the vertical component is able to receive studs of different diameters and lengths.

12. The stud feed assembly of claim 8, wherein the portion of the receiving component located above the opening in the vertical component is substantially solid, and the portion of the receiving component located across from the opening in the vertical component is substantially open.

13. The stud feed assembly of claim 8, wherein the interior geometry of the receiving component is angled or curved to guide a received stud into a substantially vertical alignment.

14. The stud feed assembly of claim 8, wherein the exterior geometry of the receiving component comprises an angle or roll bar to guide the head of a received stud onto the top of the receiving component.

15. The stud feed assembly of claim 8, wherein the angled surface has a range from about thirty degrees to about forty-five degrees.

16. The stud feed assembly of claim 1, wherein the receiving component is in physical contact with the second exit end of the second chute component.

17. The stud feed assembly of claim 1, wherein the plurality of studs comprises studs of different lengths and diameters and wherein no further changes to the stud feed assembly are required to accommodate the studs of different lengths and diameters.

18. The stud feed assembly of claim 17, wherein the plurality of studs comprises studs that range in length from 3 inches to 12 inches.

19. A cart for welding studs comprising:
 a housing having a base, a top and a side connecting the base and the top;
 the stud feed assembly of claim 1, wherein the stud feed assembly is connected to the housing, the first entry end and second entry end being positioned near the top of the housing, the second exit end being positioned near the base of the housing and extending outward from the side of the housing, the stud catcher being connected near the base of the housing, the receiving component being shaped to receive the stud from the plurality of studs such that the receiving component vertically aligns the received stud with respect to the housing;
 an arm assembly movably connected to the housing, the arm assembly having a linkage member extending beyond the side of the housing and an extension member vertically connected to the linkage member, the linkage member being configured to rotate the extension member about the housing; and
 a stud gun axially connected to the extension member wherein a worker, while in a standing position, moves the extension member to position the stud gun to capture the stud that is vertically aligned within the receiving component of the stud catcher and the worker then moves the captured stud and stud gun to a welding location where the worker activates the stud gun to stud weld the stud while the worker remains in the standing position; and
 a wheel assembly.

20. The cart of claim 19, wherein at least one of the stud loader and the stud catcher are permanently connected to the cart.

* * * * *